US012748696B2

(12) United States Patent
Horspool et al.

(10) Patent No.: US 12,748,696 B2
(45) Date of Patent: Sep. 29, 2026

(54) OPTIMIZED GARBAGE COLLECTION

(71) Applicant: Kioxia Corporation, Tokyo (JP)

(72) Inventors: Nigel Horspool, Great Missenden (GB); Brian Clarke, Berks (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/374,219

(22) Filed: Sep. 28, 2023

(65) Prior Publication Data

US 2025/0110869 A1 Apr. 3, 2025

(51) Int. Cl.
*G06F 12/02* (2006.01)
*G06F 3/06* (2006.01)

(52) U.S. Cl.
CPC ........ *G06F 12/0253* (2013.01); *G06F 3/0619* (2013.01); *G06F 3/064* (2013.01); *G06F 3/0679* (2013.01); *G06F 2212/7205* (2013.01)

(58) Field of Classification Search
CPC .... G06F 12/0253; G06F 3/0619; G06F 3/064; G06F 3/0679; G06F 2212/7205
USPC .......................................................... 711/170
See application file for complete search history.

(56) References Cited

U.S. PATENT DOCUMENTS 10,331,555 B1 * 6/2019 Muthiah ............... G06F 3/0656
10,891,070 B1 * 1/2021 Akin ..................... G06F 3/0604
2015/0347028 A1 * 12/2015 Kotte .................... G06F 3/0616 711/154
2018/0365079 A1 * 12/2018 Koch .................... G06F 9/5083
2022/0107754 A1 4/2022 Li
2024/0160562 A1 * 5/2024 Deora ................. G06F 12/0246
2024/0168684 A1 * 5/2024 Li ......................... G06F 3/0613

* cited by examiner

*Primary Examiner* — Gautam Sain
(74) *Attorney, Agent, or Firm* — Foley & Lardner LLP

(57) ABSTRACT

A method for writing data to a solid-state drive (SSD) configured to store data in a plurality of memory dies each comprising a plurality of memory blocks. The plurality of memory blocks are logically organized as a plurality of superblocks. The method is performed by a controller in communication with the plurality of memory dies. The method comprises associating a superblock of the plurality of superblocks with a data stream of a plurality of data streams received via a write command from a host interface. The method also comprises writing each data stream to the memory blocks of the respective superblock. The method also includes identifying a superblock as a bad superblock if the data stream written to the memory blocks of the superblock does not satisfy a predetermined criteria. Further, the method includes executing garbage collection only on the memory blocks of the bad superblocks.

20 Claims, 5 Drawing Sheets

Superblock Performance

OPTIMIZED GARBAGE COLLECTION

FIELD

The present disclosure relates to solid-state drives (SSD) and methods for optimizing garbage collection when write data streams are received from a host so as to reduce write amplification and improve performance.

BACKGROUND

A solid-state drive (SSD) generally has faster performance, is more compact, and is less sensitive to vibration or physical shock than a magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A controller of an SSD manages the transfer of data between a host and the memory cells of the SSD. Writing data to and reading data from the physical memory cells of an SSD typically involves transferring data between a host external to the SSD and the nonvolatile semiconductor storage devices.

SSDs are subject to large volumes of data traffic as they receive multiple read and write requests from the host. This often leads to a data distribution where data originating from various application write commands are mixed up as they are stored across the memory blocks of the SSD. During an erase operation, all memory blocks must be garbage collected resulting in a high write amplification. In order to better cope with high traffic flow, SSDs for the Enterprise and Data Center market typically arrange physical memory blocks from different NAND die in the SSD in larger superblock structures that support redundancy and protection against any one or more of the constituent blocks failing. As a result, modern data center protocols implement techniques to improve utilization and performance of the NAND superblocks in order to extend the life of the SSD. Such techniques include improved garbage collection where stale data in the NAND die of a superblock are erased simultaneously so that the constituent memory blocks can be repurposed, reorganized and reused.

An example of a data center protocol that minimizes the need for garbage collection is the Flexible Data Placement (FDP) mode of the NVMe™ standard. The FDP mode has several rules, and requires write data received from a host to include a stream identifier (StreamID) and to be organized such that a superblock stores a data from a single StreamID. When the rules are obeyed, FDP mode enables the processor to erase data from a specific application using an NVMe™ deallocate command to a logical block address (LBA) range that will invalidate data on an entire superblock used for the application when the data is no longer required. This does away with the conventional method of performing garbage collection on the entire pool of superblocks in the SSD prior to erasure. As garbage collection is not performed, write amplification is reduced.

The FDP rules are not obeyed when the host and/or application continues to write data to a logical block address (LBA) region of a superblock after the superblock is full (thereby consuming many superblocks), or it does not issue a deallocate after finishing a 'read only' mode and proceeds to overwrite the data in the superblock (also consuming many superblocks). This causes the controller to go into a mode in which garbage collection is triggered. Currently, the garbage collection function in FDP mode selects the superblocks to garbage collect based on superblocks that have the most stale data, or superblocks which have the largest number of unoccupied memory blocks. Once triggered, garbage collection is performed on superblocks selected based on the aforementioned criteria, regardless of whether the superblocks contain data streams that obey the FDP rules or not. It should be noted that in FDP mode, not all superblocks are filled before they are transitioned to 'read only' mode. Due to the manner in which superblocks are selected for garbage collection in FDP mode, data from superblocks from multiple hosts and/or applications will be mixed.

The garbage collection function currently used in FDP mode overburdens the SSD. This is because no differentiation is made between superblocks that contain data streams that obey the FDP rules and those that do not when selecting superblocks for garbage collection. As a result, superblocks that need not be garbage collected (i.e. those that contain data streams that obey the FDP rules) are mixed into the same pool as superblocks that require garbage collection (i.e. those that contain data streams that do not obey the FDP rules). This causes the controller to garbage collect from superblocks which need to be simply erased via deallocate and trim commands. This contributes to write amplification and is undesirable as it degrades the performance of the SSD.

SUMMARY

According to an embodiment of the present disclosure, there is provided a method for writing data to an SSD configured to store data in a plurality of memory dies each comprising a plurality of memory blocks, the plurality of memory blocks are logically organized as a plurality of superblocks, the method performed by a controller in communication with the plurality of memory dies. The controller begins by associating a superblock of the plurality of superblocks with a data stream of a plurality of data streams received via a write command from a host interface. The controller then writes each data stream to the memory blocks of the respective superblock. Next the controller identifies a superblock as a bad superblock if the data stream written to the memory blocks of the superblock does not satisfy a predetermined criteria. Here the predetermined criteria may be defined by a Flexible Data Placement (FDP) mode of the NVMe™ standard. The controller then executes garbage collection only on the memory blocks of the bad superblock.

According to a further embodiment of the present disclosure, there is provided a solid-state drive (SSD) comprising a non-volatile semiconductor memory device comprising a plurality of memory dies for storing data, the memory dies comprising a plurality of memory blocks, the plurality of memory blocks logically organized as a plurality of superblocks. The SSD also comprises a controller in communication with the plurality of memory dies. The controller is configured to associate a superblock of the plurality of superblocks with a data stream of a plurality of data streams received via a write command from a host interface. The controller is also configured to write each data stream to the memory blocks of the respective superblock. Additionally, the controller is configured to identify a superblock as a bad superblock if the data stream written to the memory blocks of the superblock does not satisfy a predetermined criteria.

Further, the controller is configured to execute garbage collection only on the memory blocks of the bad superblocks.

According to the above embodiments, superblocks not marked as bad superblocks are merely deallocated by the host application allowing the deallocated superblocks to be erased for subsequent use. This means that no garbage collection is performed on the superblocks that are not marked as bad superblocks. Such targeted garbage collection significantly reduces the frequency with which garbage collection is performed as compared to garbage collection methodologies employed by the typical NVMe™ FDP mode. This drastically reduces write amplification in the SSD, thereby improving the performance of the SSD.

In certain implementations, the predetermined criteria is defined by an NVMe™ Flexible Data Placement (FDP) protocol. In some implementations, the predetermined criteria is satisfied if the write command causes the controller to delete all data in the memory blocks of the superblock prior to writing the data stream. In further implementations, the predetermined criteria is satisfied if the write command causes the controller to prevent writing to the memory blocks of the superblock when the data stream contains data of a size that would exceed a size of the superblock. In other implementations, the method further comprises executing garbage collection on memory blocks associated with an overflow superblock, the memory blocks associated with the overflow superblock containing overflow data from the data stream that exceeds the size of the superblock. In certain implementations, the memory blocks of the overflow superblock consolidate overflow data from multiple data streams.

In some implementations, the method further comprises setting a flag associated with the superblock if the predetermined criteria is not satisfied, and executing garbage collection on the memory blocks of the superblock associated with the set flag. In further implementations, each superblock contains at least one memory block from each memory die. In other implementations, each superblock is associated with a single stream of data. In certain implementations, the plurality of data streams originates from (i) multiple streams from different applications running on the host, (ii) multiple streams from multiple instances of a single application, or (iii) multiple streams within a single application. In further implementations, the method further comprises translating a logical block address (LBA) specified in the write command to a physical block address of the memory blocks using a flash transition layer (FTL) of the controller. In other embodiments, the method also comprises identifying the superblock of the plurality of superblocks that corresponds to the physical block address of the memory blocks via a look up table using the LBA from the write command.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
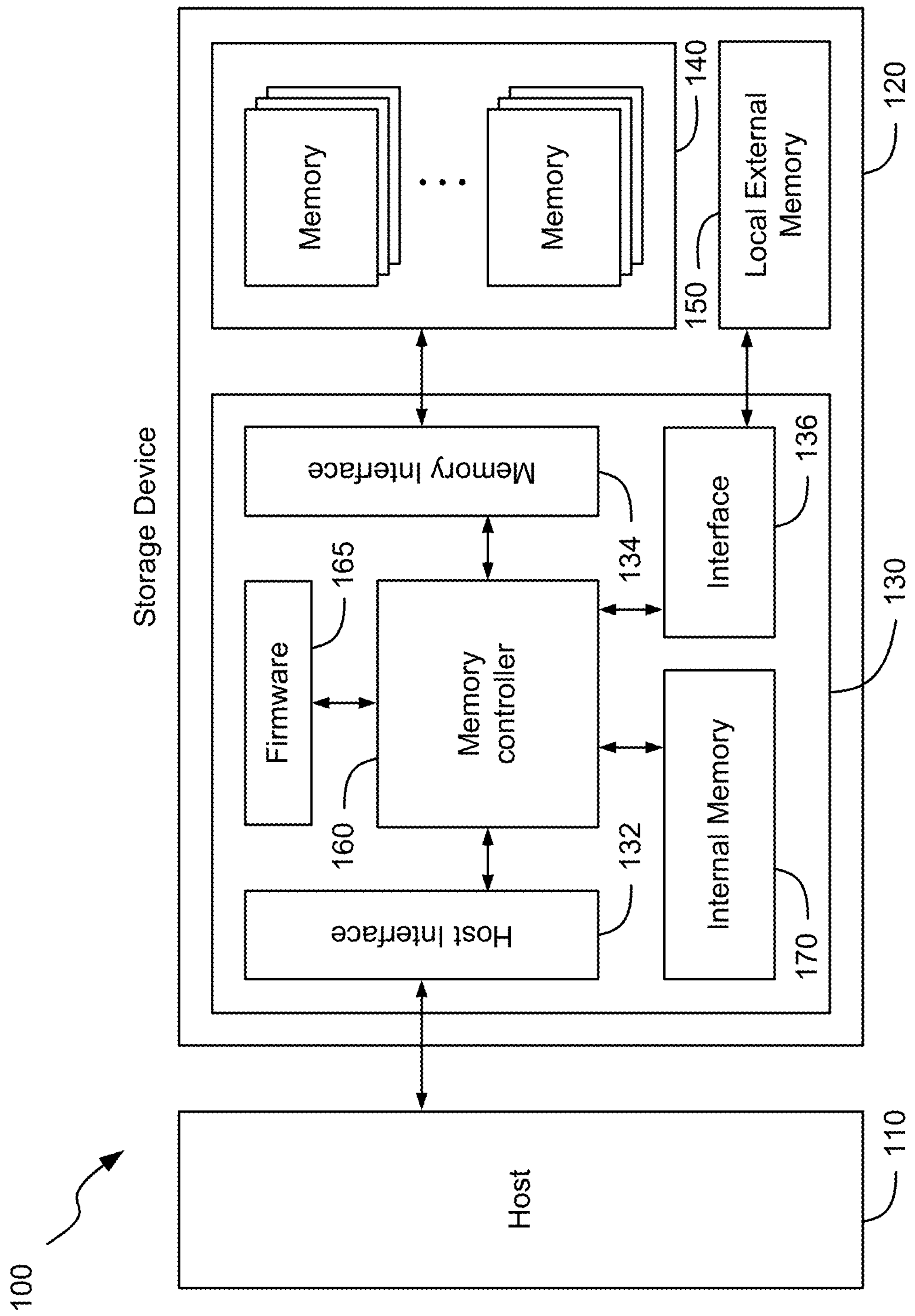
FIG. 1 illustrates a schematic representation of an SSD, configured according to one or more embodiments of the present disclosure.

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD memory architectures having a similar need to improve garbage collection within the device to improve performance and extending the life span of the SSD among other benefits readily recognizable by person of ordinary skill in the art.

Modern data center orientated SSD protocols implement techniques that extend the life of the SSD. An example of such a protocol is the NVMe™ Flexible Data Placement (FDP) mode described in the NVMe™ specification TP4146, and as described in the presentation entitled “Hyperscale Innovation: Flexible Data Placement Mode (FDP),” presented at the Flash Memory Summit (FMS) 2022. (See https://nvmexpress.org/wp-content/uploads/Hyperscale-Innovation-Flexible-Data-Placement-Mode-FDP.pdf and https://nvmexpress.org/nvmeflexible-data-placement-fdp-blog/, the disclosures of which are hereby incorporated herein by reference in entirety.) Such protocols may have knowledge of the superblock size and manage the data written to superblocks according to the size. The protocol can open many superblocks to allow multiple separate host write streams to write data to the SSD with each superblock containing data from a single stream. The protocol will write data to a superblock, allow reads to the superblock and then delete all the data in the superblock with a single command. This reduces the amount of garbage collection required before the NAND blocks of the deleted data can be erased. An important element of the protocol is that superblocks contain data from a single stream, that is, superblocks do not contain a mix of data from different streams. This reduction of garbage collection based on single stream data superblocks and deallocation before writing will mean that the host can write much more data to the SSD before the drive wears out since the write amplification will be reduced compared to a standard SSD.

The present disclosure provides a method for identifying when a data stream of a write command does not comply with the flexible data placement (FDP) protocol rules. Here the controller checks the flash translation layer data for the logical block address of the write commands and marks the superblocks to which the data stream is written as bad superblocks. Garbage collection is then performed only on the superblocks marked as bad superblocks while the superblocks not marked as bad superblocks are merely deallocated and erased for subsequent use. That means no garbage collection is performed on the superblocks not marked as bad superblocks. Such targeted garbage collection significantly reduces the frequency with which garbage collection is performed as compared to garbage collection methodologies employed by the NVMe™ FDP protocol. This drastically reduces write amplification in the SSD, thereby improving the performance.

FIG. 1 is a block diagram of a memory system 100 comprising at least one host 110 in communication with a storage device 120. The host 110 is a computing system that comprises processors, memories, and other components as is generally known in the art, and which is not shown in FIG. 1 for the sake of brevity. Storage device 120 provides non-volatile storage functionality for use by the host 110. Storage device 120 may include an integrated circuit comprising a controller communicatively coupled to a memory such as an SSD or HDD. Such an integrated circuit may comprise a system-on-chip (SoC) 130. SoCs are advantageous as they provide a single integrated circuit that contains circuitry and components of the electronic system for the storage device 120 to function. SoC 130 may be communicatively coupled to a memory 140. Memory 140 may additionally comprise a NAND semiconductor memory, such as a NAND based flash memory device. The memory 140 may be organized into pages, blocks, planes, die and chips. Memory 140 may comprise a plurality of NAND chips, such as, for example, 32, 64, 128, 256 separate NAND chips, and each NAND chip can be running separate commands on individual die (not shown) within the chip. Memory 140 may have blocks organized into superblocks, as will be described in detail below.

Storage device 120 may include a local memory external to the SoC 130, such as a dynamic random access memory ("DRAM") 150. However, a person of ordinary skill in the art would understand that other types of memory such as static random access memory ("SRAM") or other suitable alternatives can be employed without departing from the scope of the present disclosure. Local external memory 150 comprises several buffers used to buffer data during read and write operations between the host 110 and the memory 140. Further, storage device 120 may comprise a host interface 132 which enables communication with the host 110 for the receipt of I/O commands and Vendor Unique Commands (VUCs). Storage device 120 may also include a memory interface 134 for communication with the memory 140 (through a plurality of channels, not shown), and an interface 136 for communication with the local external memory 150. Interface 132 on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") bus, for example. Interface 134 may comprise an Open NAND Flash Interface (ONFI) or a manufacturer's proprietary interface, for example. Interface 136 may comprise, for example, an interface according to, but not limited to: a Double Data Rate (DDR) memory bus standard such as DDR3, DDR4 or DDRS; a Low Power Double Data rate (LPDDR) memory bus standard such as LPDDR3, LPDDR4 or LPDDR5; a Hybrid Memory Cube (HMC) memory bus standard.

Also shown in FIG. 1 is a memory controller 160 that enables the storage device 120 to perform various functions such as processing VUC commands received from the host 110 as well as internal commands generated within the storage device 120 to maintain functionality (e.g. NVMe™ commands such as 'FormatNVM'). The storage device 120 also includes a Read-Only Memory (ROM) that stores firmware 165 for the operation of various states of the storage device 120. The firmware 165 comprises computer executable instructions that are executed by the controller 160 for operation of the storage device 120. The ROM is programmed with the firmware 165 during manufacture of the storage device 120 and may be re-programmed by the controller 160 as necessary. This allows the operation of the storage device 120 to be adapted as needed. The storage device 120 may also include an internal memory 170, such as a static random access memory ("SRAM"), which forms part of the same integrated circuit as the SoC 130. The internal memory 170 may be configured to store data such system metadata, mapping tables and bad block lists. In some embodiments, such data may also be stored in the local external memory 150. The memory controller 160 may also comprise a flash translation layer (FTL) that enables the SoC controller 130 to perform various activities that facilitate the processing of read and write commands received from the host 110, such as, for example, translating an LBA specified by the host 110 to a physical block address in the NAND memory 140 for garbage collection.

Memory controller 160 may also comprise an error correction encoder and decoder. The decoder may comprise an Encryption and Error Correction Code (ECC) decoder communicatively coupled to a hard-decision decoder and a soft-decision decoder. The ECC decoder may also include a BCH error corrector or any other cyclic error corrector. Data written to the memory 140 is encoded with an ECC code in a first instance to give ECC-encoded data. To decode data from the memory, data from a target row of memory cells is passed through the hard-decision decoder, and, if required, the soft-decision decoder. Additionally, wear and tear of the device during its lifespan result in errors being introduced to the data when the data is read out from the memory device.

In order to manage data flow within SSD 120, controller 160 may organize the memory blocks in the NAND dies 140 as superblocks. The larger superblock structure supports redundancy and protection against any one or more of the constituent blocks failing. A superblock may comprise a particular grouping of memory blocks to aid organization and management of data in the memory devices 140, as exemplified in the RAID stripe frames shown in FIGS. 2 and 3. Here, NAND dies B0-B15 are dies from NAND devices 140. NAND dies B0-B15 are organized as superblocks X, Y and Z where each superblock comprises one memory block from each NAND die B0-B15. For example, superblock X comprises one NAND block from each of dies B0-B15 that are not already used by another superblock, superblock Y comprises one NAND block from each of dies B0-B15 that are not already used by another superblock, and superblock Z comprises one NAND block from each of dies B0-B15 that are not already used by another superblock. In some instances, RAID parity is added for extra data protection (see memory blocks labeled 'R' in FIG. 2). By organizing the memory blocks as superblocks, NAND devices 140 may present thousands of superblocks for use by the SSD to aid management of data streams received from host 110.

Typically, data from a data stream received from a host is written in a fixed sequence from die B0, to die B1 . . . and finally to die B15. Once a superblock is filled, a new superblock is selected for writing data from the host data stream, whether to continue a writing sequence of data from the same data stream (the new superblock would be termed an "overflow superblock"), or a new writing sequence for a new data stream received from the host. When all memory blocks of a superblock have been written to, there may be some data from the data stream that has been written beyond the capacity of the superblock. Such over-writing occurs when the data to be written is of a size that is larger than the capacity of the memory blocks in the superblock. In such a situation, a new superblock may be opened up so that the spill over data can be written. However in such a case, the memory blocks of the newly opened superblock may not all be full, and may actually be mostly empty. This would make the newly opened superblock a candidate for conventional garbage collection. This is because conventional garbage collection consolidates data from superblocks that are mostly empty, so as to make barely filled superblocks available for data from new data streams received from the host. Thus, garbage collection will move the valid data spilled over from the newly opened superblock to a garbage collected superblock (e.g. superblock A in FIG. 3, described in detail below).

For a typical datacenter SSD, garbage collection will have moved valid data from between 2 to 8 superblocks in the manner described above to fill up a garbage collected superblock before it can be erased (to free up the garbage collected superblock so that the garbage collected superblock itself can be made available to the host again). This means that for every one superblock worth of data that is written, 2 to 8 superblocks will have to be garbage collected before the garbage collected superblock will be sufficiently filled for erasure. This extra garbage collection contributes to write amplification within the SSD. This write amplification may be reduced by the host sending a ‘trim’ command to delete obsolete data. A trim command is generally sent by the host to the SSD to inform the SSD which memory blocks can be erased because they are no longer in use. However, with the conventional superblock organization within the NAND devices 140, if conventional garbage collection has created reclaim superblocks that contain a mix of data from multiple write streams, a trim command would not delete all data in the superblock due to the mixing of data. Thus, the data in this partial superblock could likely be reclaimed in another garbage collection triggering multiple reclaim cycles which increases the write amplification.

Figure 2:
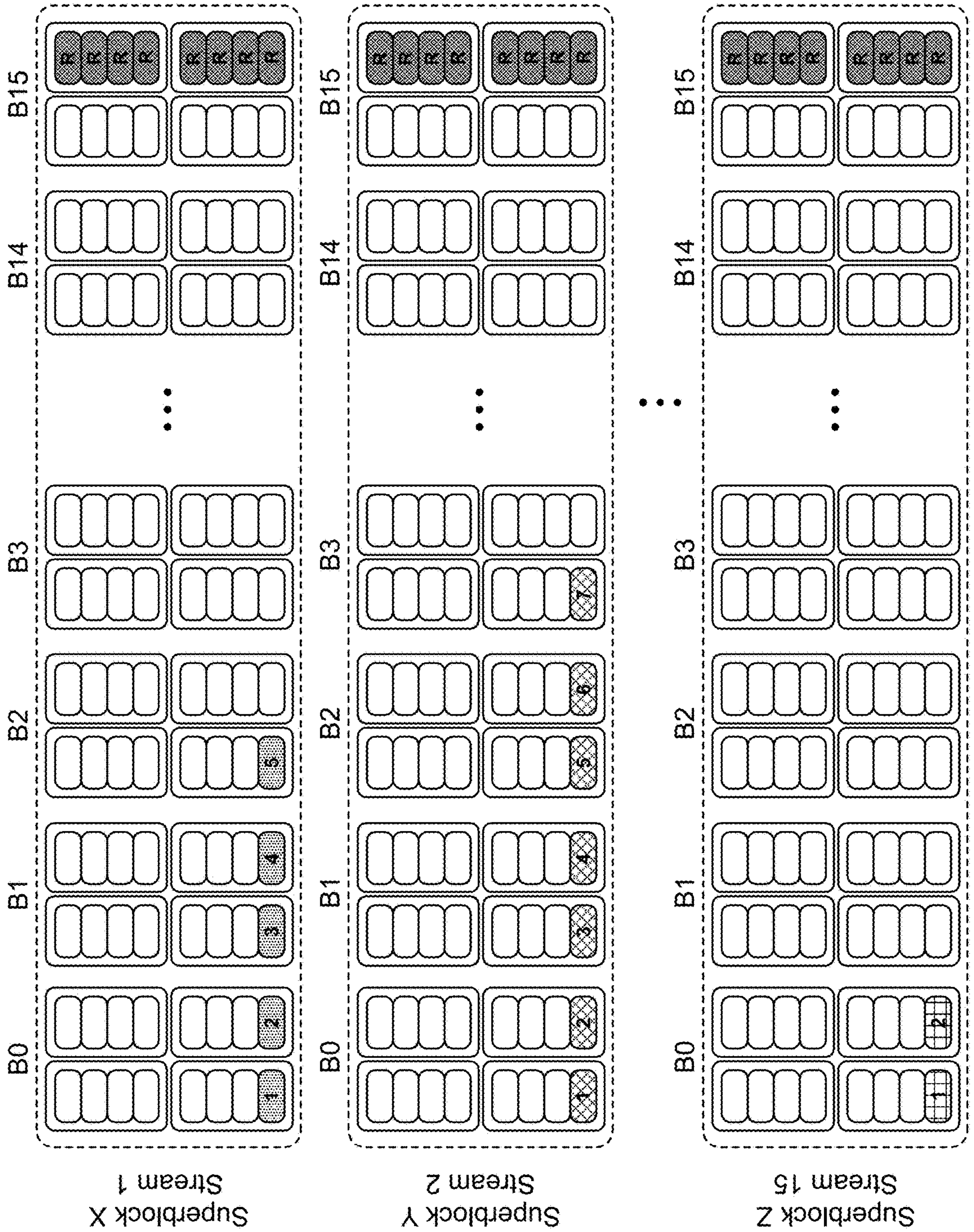
FIG. 2 illustrates exemplary superblock structures in the memory device of the SSD in FIG. 1.
Figure 3:
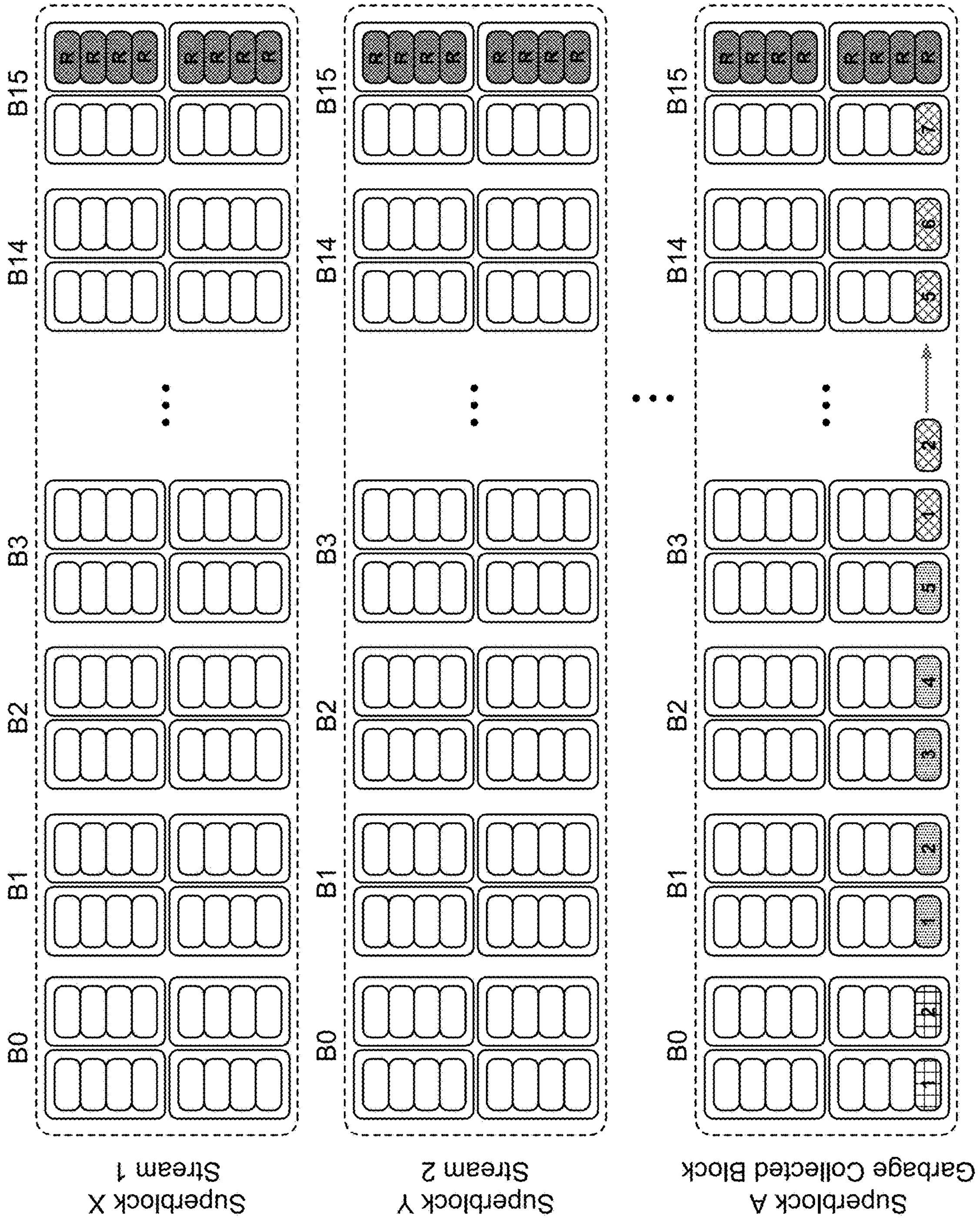
FIG. 3 illustrates an exemplary the state of the memory blocks of the various superblocks in the SSD of FIG. 1 after garbage collection is performed.

Typical data placement protocols (e.g. NVMe™ FDP protocol, described above) have knowledge of the superblock size and manages the data written to superblocks according to the size. Such protocols may open many superblocks to allow multiple separate host write streams to write data to the SSD with each superblock containing data from a single stream. The FDP mode allows the controller to write data to a superblock, read from the superblock and delete all the data in the superblock with a single command. This reduces the amount of garbage collection required before the NAND blocks containing the deleted data can be erased. An important element of the FDP mode is that superblocks contain data from a single stream (i.e. each superblock does not contain a mix of data from different streams). This is shown in FIG. 2 where memory blocks of superblock X contain data from Stream 1 as shown by shaded memory blocks 1-5 in NAND dies B0, B1 and B2, memory blocks of superblock Y contain data from Stream 2 as shown by shaded memory blocks 1-7 in NAND dies B0, B1, B2 and B3, and memory blocks of superblock Z contain data from Stream 15 as shown by shaded memory blocks 1-2 in NAND die B0. Assuming the protocol rules are obeyed, limiting one stream per superblock reduces the need for garbage collection. Because no garbage collection is required, a deallocation command before writing is all that is needed. This allows the host to write much more data to the SSD before the drive wears out because the write amplification will be small compared to a standard SSD. This reduces write amplification in the SSD. However if the protocol rules are not obeyed, conventional garbage collection will take place.

The key rules of the Flexible Data Placement Protocol are as follows. Firstly, the host must delete all data (using an NVMe ‘deallocate’ command, for example) in the superblock before over-writing the superblock. Second, the host must ‘close’ the superblock before it writes more data beyond the size of the superblock. Writing more data than available space in the superblock will cause the FTL to write this extra data into an ‘overflow’ superblock which can contain data from many data streams. This goes against the requirement that superblocks contain data from a single host stream so that no garbage collection is needed when the host deallocates the data.

Garbage collection is executed in the error-use case where one or more of the host write data streams do not obey the key rules described above, hereinafter referred to as “bad streams.” These bad streams may consume the available over provisioning superblocks which would trigger garbage collection. However, in a standard FTL, the conventional garbage collection function will select superblocks that are most empty from the whole pool of superblocks in the memory device. This may include superblocks that were written by good streams that obey the above key rules. This means that superblocks containing valid data will also be garbage collected into a new superblock which will typically include data from other streams, resulting in superblocks that contain a mix of data from different streams. This can be seen in FIGS. 2 and 3 where memory blocks 1-5 initially in superblock X, memory blocks 1-7 initially in superblock Y, and memory blocks 1-2 initially in superblock Z have been garbage collected into superblock A when one of the FDP rules have been disobeyed by a data stream from the host. This results in garbage collected superblock A having data from multiple streams which includes data from well behaved Streams 1, 2 and 15 and data from the bad stream that triggered the garbage collection.

Figure 4:
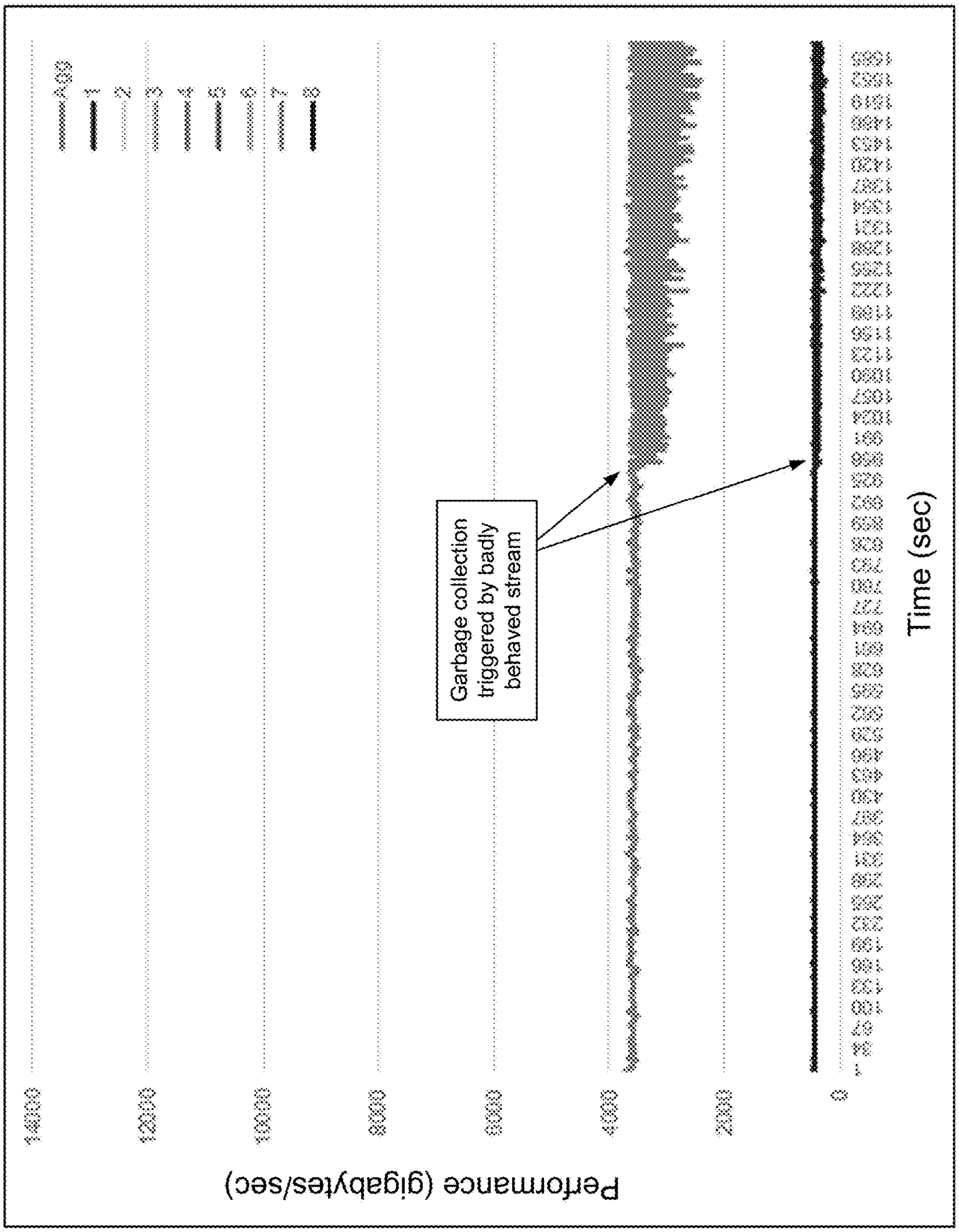
FIG. 4 provides exemplary performance data of the SSD after typical garbage collection as depicted in FIGS. 2 and 3.

FIG. 4 shows the impact of garbage collection on the performance of the SSD for eight streams of data. The results show cases where there is a single bad stream where garbage collection is performed by selecting from the whole pool of superblocks originating from both well behaved and badly behaved streams, and not just garbage collection on superblocks from badly behaved streams. FIG. 4 shows a significant variation in performance once a bad badly behaved stream from a host write command is processed. Garbage collection is triggered by the badly behaved stream (around 950 sec) where performance of the device gets progressively worse from that point onwards (the line marked ‘Agg’ indicates aggregate performance across all eight streams, reducing performance by up to about 30%).

According to the new garbage collection function of the present disclosure, garbage collection is only performed on superblocks from bad streams that do not obey the key rules. This will reduce the overall write amplification by identifying bad streams and garbage collecting only the bad streams. The garbage collection function identifies when a data stream does not obey the first rule, and, optionally, the second rule. However, a person of ordinary skill in the art would understand that other rules or criteria may be used to determine a “bad stream” without departing from the scope of the present disclosure. According to embodiments of the present disclosure, once the bad data stream is identified, garbage collection is only performed on the superblocks associated with memory blocks containing invalid data from the bad data stream. No garbage collection is performed on superblocks associated with memory blocks containing valid data from good data streams.

Here the controller identifies if the write command associated with the host data stream satisfies a predetermined criteria, and if the predetermined criteria is not satisfied, garbage collection is executed on the memory blocks of the superblock. The predetermined criteria may comprise the inclusion of instructions in the host write command that causes the controller to delete all data in the memory blocks of the superblock prior to writing the data stream (first rule). Specifically, the controller may check the FTL data for the physical block addresses of the memory blocks of the superblock corresponding to the LBA of the write command. Here the physical block addresses of the memory blocks of the superblock may be identified via a look up table using the LBA from the write command. If the FTL data of the LBA points to a superblock other than the superblock that the data is being written to then the host has not deallocated the superblock before starting to overwrite the memory blocks in the superblock. The two superblocks corresponding to the data stream (the existing superblock for the LBA in the write command, and the new superblock associated to the spilled over or overflow data stream) are marked as bad stream superblocks.

The predetermined criteria may also comprise the inclusion of instructions in the host write command that causes the controller to prevent writing to the memory blocks of the superblock when the data stream contains data of a size that would exceed a size of the superblock (second rule). Here, superblocks are similarly tagged as bad stream superblocks when the data stream overfills the superblock, so additional data is written into an overflow superblock. In this case, the overfilled superblock and overflow superblock are both tagged as bad stream superblocks.

If the write command associated with the host data stream does not satisfy the predetermined criteria, the superblock to which the write data stream has been written to is marked as a bad stream superblock. This may be done by setting a flag associated with the bad stream superblock. The FTL of the controller then executes garbage collection only on the bad stream superblocks with the set flag. By performing garbage collection only on superblocks containing data from bad streams, the write amplification caused by conventional garbage collection used in FDP mode is greatly reduced, thereby improving the performance of the SSD. According to embodiments of the present disclosure, once bad streams are identified, no garbage collection is performed on superblocks containing valid data from good data streams. Further, a person of ordinary skill in the art would understand that other predetermined criteria may be used to identify a bad stream without departing from the scope of the present disclosure.

Figure 5:
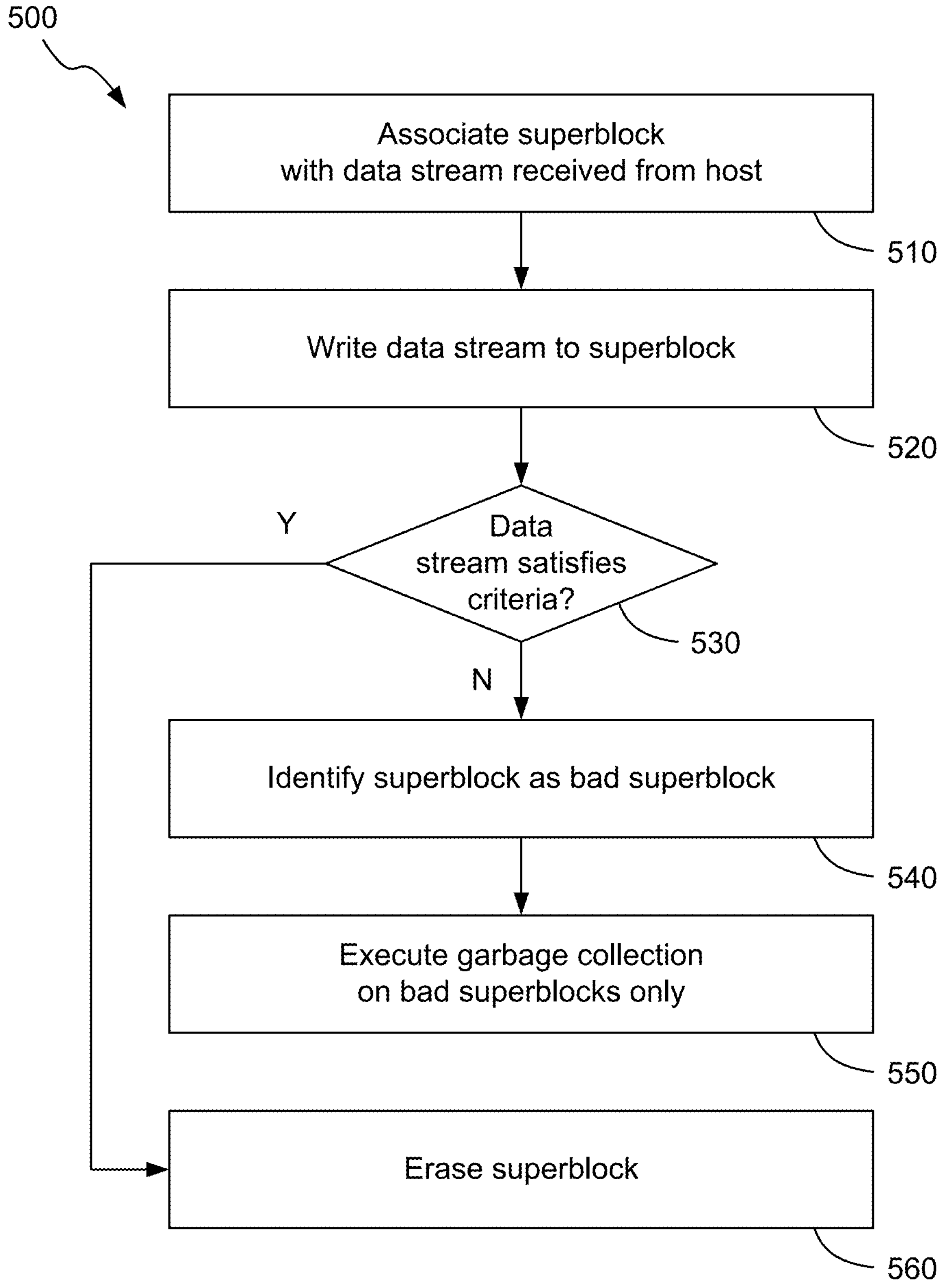
FIG. 5 is a flow diagram of a method for performing garbage collection on the SSD of FIG. 1 by identifying superblocks that do not satisfy Data Placement Protocol criteria, according to one or more embodiments of the present disclosure.

FIG. 5 illustrates an exemplary flow diagram of a method 500 of processing a write command received by the SSD 120 from a host 110, according to an embodiment of the present disclosure. Method 500 relates to an improvement on the Flexible Data Placement (FDP) protocol of the NVMe™ standard, as described above. Method 500 begins at step 510 where controller 160 associates a superblock with a data stream received with the write command. The protocol may open many superblocks to allow multiple separate host write streams to write data to the SSD with each superblock containing data from a single stream. The method then progresses to step 520 where the controller 160 writes the data from the received data stream to the superblock. Next the controller 160 determines if the write command satisfies a predetermined criteria (step 530).

The predetermined criteria may be defined by the FDP protocol and is based on key rules. The key rules include (1) the host must delete all data (using an NVMe™ 'deallocate' command, for example) in the superblock before overwriting the superblock, and, optionally, (2) the host must 'close' the superblock before it writes more data beyond the size of the superblock. In the case of the first rule, the controller 160 checks the FTL data for the LBA of the write command and determines whether the LBA points to memory blocks of an existing superblock that has not yet been deallocated before the controller starts to overwrite the memory blocks of the superblock. As for the second rule, superblocks are tagged as bad stream superblocks when the data stream overfills the superblock, so additional data is written into an overflow superblock. In this case, the overfilled superblock and overflow superblocks are both tagged as bad stream superblocks.

If the write data stream does not satisfy the criteria ('N' at step 530), the write data stream does not obey the FDP protocol rules (the aforementioned error-use case) and the superblock to which the write data stream is written is identified as a bad superblock and is marked for garbage collection (step 540). This may be done by setting a flag associated with the bad superblock. The FTL of the controller then executes garbage collection only on the bad stream superblocks (step 550). However, if the write data command does satisfy the criteria ('Y' at step 530), the data stream is valid and obeys the FDP protocol rules, and no garbage collection is performed on the superblock. Instead, as shown in step 560, a trim command is issued by the host for the LBA region that maps to the superblock and since it obeys the FDP protocol to trim the whole region, the memory blocks in the superblock are erased to enable the superblock to be made available for subsequently received data streams from the host 110.

In the foregoing, all recitation of "layer" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. All recitation of "device," "memory," and "dies" are used interchangeably when used in relation to the NAND non-volatile semiconductor memory device. The term "similar" as used herein indicates close to identical but for a stated difference. The terms "protocol" and "mode" are used interchangeably and refer to the Flexible Data Placement (FDP) methodoloy of the NVMe™ standard.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method for writing data to a solid-state drive (SSD) configured to store data in a plurality of memory dies each comprising a plurality of memory blocks, the plurality of memory blocks logically organized as a plurality of superblocks, the method performed by a controller in communication with the plurality of memory dies, and comprising:

associating a superblock of the plurality of superblocks with a data stream of a plurality of data streams received via a write command from a host interface;

writing the data stream to the memory blocks of the associated superblock in response to the write command;

identifying, further in response to the write command, the associated superblock as a bad superblock for garbage collection when it is determined that the write command does not satisfy a predetermined criteria; and performing a targeted garbage collection only on the memory blocks of certain of the plurality of superblocks that have been identified as bad superblocks wherein the targeted garbage collection excludes memory blocks of other of the plurality of superblocks that have not been identified as bad superblocks.

2. The method of claim 1, wherein the predetermined criteria is defined by an NVMe™ Flexible Data Placement (FDP) protocol.

3. The method of claim 2, wherein the predetermined criteria is satisfied if the write command causes the controller to delete all data in the memory blocks of the superblock prior to writing the data stream.

4. The method of claim 3, wherein the predetermined criteria is satisfied if the write command causes the controller to prevent writing to the memory blocks of the superblock when the data stream contains data of a size that would exceed a size of the superblock.

5. The method of claim 4, further comprising:

executing garbage collection on memory blocks associated with an overflow superblock, the memory blocks associated with the overflow superblock containing overflow data from the data stream that exceeds the size of the superblock.

6. The method of claim 5, wherein the memory blocks of the overflow superblock consolidate overflow data from multiple data streams.

7. The method of claim 1, further comprising:

setting a flag associated with the superblock if the predetermined criteria is not satisfied; and executing garbage collection on the memory blocks of the superblock associated with the set flag.

8. The method of claim 1, wherein each superblock contains at least one memory block from each memory die.

9. The method of claim 1, wherein each superblock is associated with a single stream of data.

10. The method of claim 1, wherein the plurality of data streams originates from (i) multiple streams from different applications running on the host, (ii) multiple streams from multiple instances of a single application, or (iii) multiple streams within a single application.

11. The method of claim 1, further comprising determining if the predetermined criteria are satisfied by checking compliance of write commands associated with the associated data streams with one or more rules specified for the certain superblocks.

12. A solid-state drive (SSD) comprising:

a non-volatile semiconductor memory device comprising a plurality of memory dies for storing data, the memory dies comprising a plurality of memory blocks, the plurality of memory blocks logically organized as a plurality of superblocks; and a controller in communication with the plurality of memory dies, the controller configured to:

associate a superblock of the plurality of superblocks with a data stream of a plurality of data streams received via a write command from a host interface;

write the data stream to the memory blocks of the associated superblock in response to the write command;

identify the associated superblock as a bad superblock when it is determined that the write command does not satisfy a predetermined criteria; and perform a targeted garbage collection only on the memory blocks of certain of the plurality of superblocks that have been identified as bad superblocks wherein the targeted garbage collection excludes memory blocks of other of the plurality of superblocks that have not been identified as bad superblocks.

13. The method of claim 12, wherein the predetermined criteria is defined by an NVMe™ Flexible Data Placement (FDP) protocol.

14. The SSD of claim 13, wherein the predetermined criteria is satisfied if the write command causes the controller to delete all data in the memory blocks of the superblock prior to writing the data stream.

15. The SSD of claim 14, wherein the predetermined criteria is satisfied if the write command causes the controller to prevent writing to the memory blocks of the superblock when the data stream contains data of a size that would exceed a size of the superblock.

16. The SSD of claim 15, wherein the controller executes garbage collection on memory blocks associated with an overflow superblock, the memory blocks associated with the overflow superblock containing overflow data from the data stream that exceeds the size of the superblock.

17. The SSD of claim 16, wherein the memory blocks of the overflow superblock consolidate overflow data from multiple data streams.

18. The SSD of claim 12, wherein the controller sets a flag associated with the superblock if the predetermined criteria is not satisfied, and executes garbage collection on the memory blocks of the superblock associated with the set flag.

19. The SSD of claim 12, wherein each superblock contains at least one memory block from each memory die.

20. The SSD of claim 12, wherein each superblock is associated with a single stream of data.

* * * * *